United States Patent [19]

Gennetten

[11] 4,245,321
[45] Jan. 13, 1981

[54] ROTATING RASTER GENERATOR

[75] Inventor: Edward W. Gennetten, San Diego, Calif.

[73] Assignee: The United States of America as represented by the Secretary of the Navy, Washington, D.C.

[21] Appl. No.: 12,614

[22] Filed: Feb. 16, 1979

[51] Int. Cl.³ .................. G06F 3/153; G06F 15/20
[52] U.S. Cl. .................. 364/521; 315/378; 340/727; 364/731
[58] Field of Search .......... 364/521, 731; 340/727; 315/364, 378; 358/104

[56] References Cited

U.S. PATENT DOCUMENTS

| 3,471,742 | 10/1969 | Kendall et al. | 315/378 |
| 3,813,528 | 5/1974 | Blanding | 364/721 X |
| 3,925,765 | 12/1975 | Berwin et al. | 340/727 X |
| 3,959,582 | 5/1976 | Law et al. | 364/521 X |
| 4,127,850 | 11/1978 | Vallins | 340/727 X |

Primary Examiner—Jerry Smith
Attorney, Agent, or Firm—Richard S. Sciascia; E. F. Johnston; H. Fendelman

[57] ABSTRACT

A raster generator for producing a raster-type display on a random scan display terminal where the raster can be oriented at any selected angle of rotation. The rotating raster generator responds to a digital input signal representing the desired angle of rotation which may represent, for example, the turning or rolling motion of a vehicle. The generator operates digitally to provide an output comprised of two sets of digital signals, each signal set representing an axis rotated in an amount directly related to the value of the input angle. The signals are presented as inputs to the deflection coils of a cathode-ray tube (CRT) or like display.

10 Claims, 11 Drawing Figures

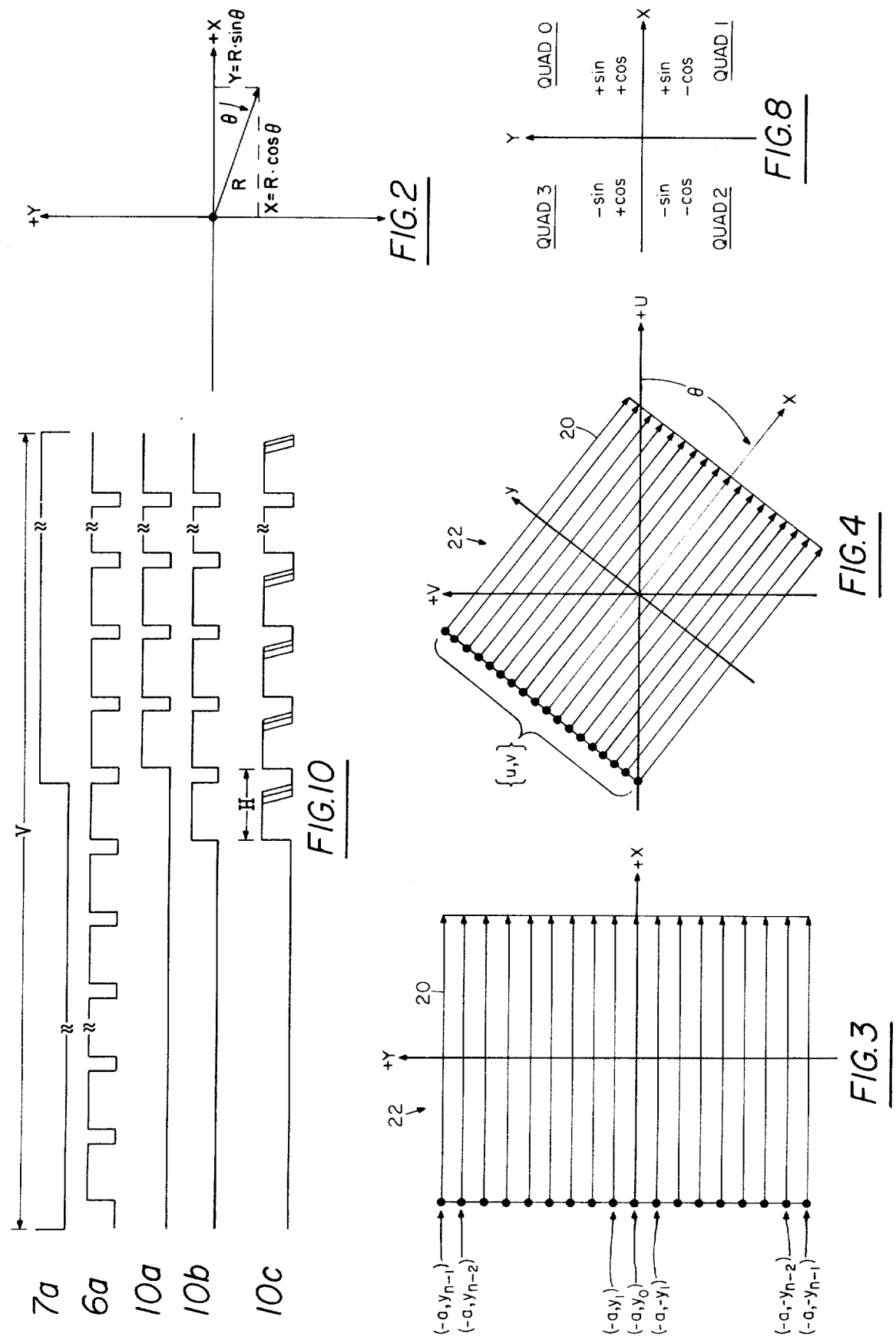

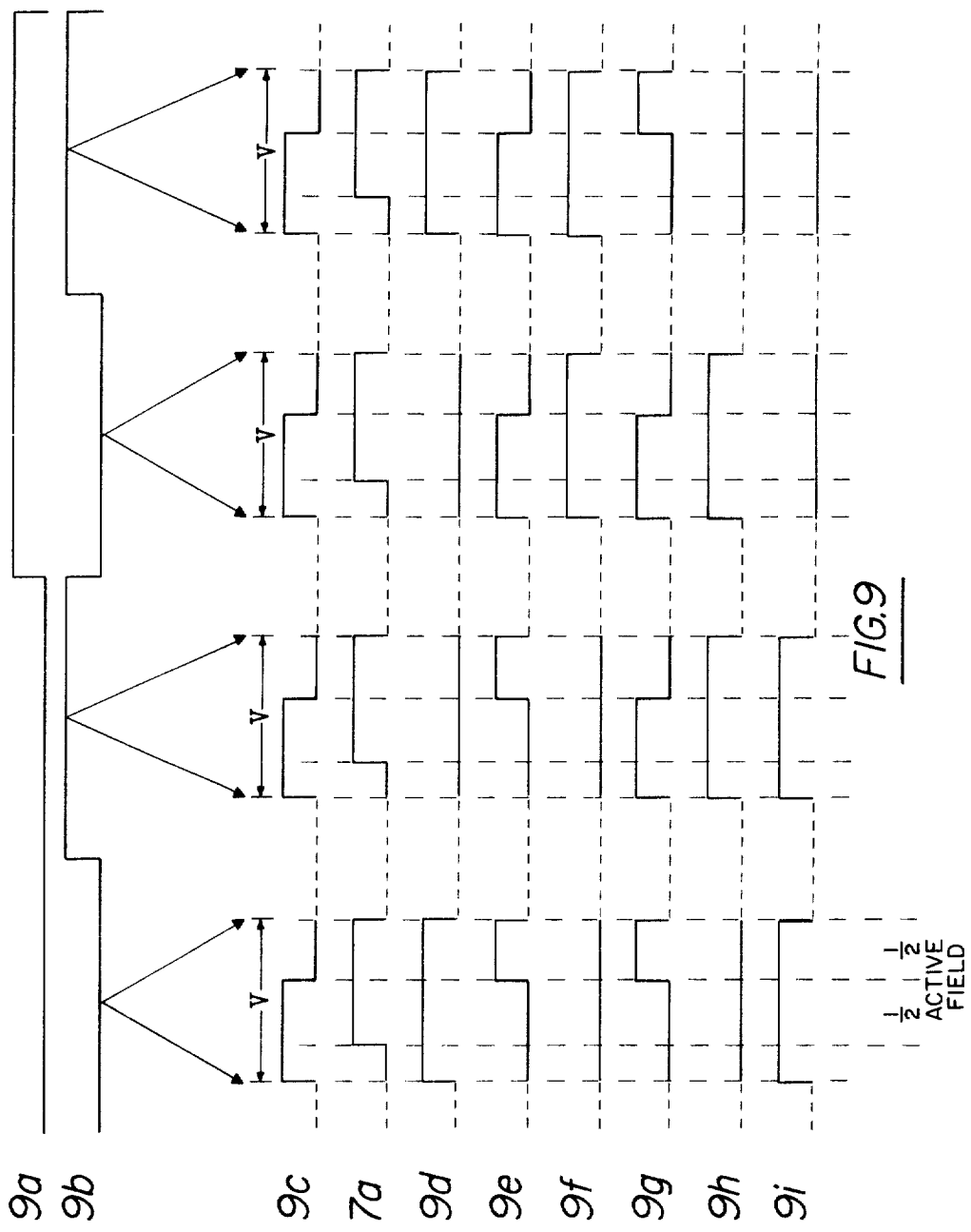

ROTATING RASTER GENERATOR

BACKGROUND OF THE INVENTION

The present invention relates generally to display systems of the CRT type and to any suitable solid state matrix display device capable of producing a display equivalent to that produced by a conventional CRT. More specifically, the present invention is related to the field of devices that respond to an angular input and generate an output that is comprised of scanning signals for utilization by the deflection system of a random scan or similar display.

Existing methods for displaying the turning or rolling motion of a device, hereinafter referred to as rotation, have utilized computer software programmed to employ conventional rotation of axis equations and operating in a sequential manner on all picture information. This approach is too slow to be of any significant value considering the real time rates of rotation of conventional vehicles such as aircraft and ships. Another method used in the past employs electronic/mechanical hardware comprising a servo system coupled to a rotatable deflection yoke mounted about the neck of a CRT. The principal limitations of this method are its expense and limited reliability and accuracy, particularly in an environment subject to shock and vibration.

SUMMARY OF THE INVENTION

The present invention relates to a means for simulating the turning or rolling motion associated with a device. For example, the rotation of a conventional vehicle such as a boat or airplane can be simulated at a real time rate. In accordance with the present invention a raster scan is generated on a random scan display terminal such that the raster scan can be rotated any number of degrees as determined by a digital input signal representing the desired angle of rotation. The term random scan display as used herein is defined as a display having symmetrical X and Y access ports responsive to any order of access where the access ports are defined as the point of entry for signals which control the X, Y, position of display imagery. In the operation of the invention the digital number representing the desired angle of rotation relative to a reference coordinate system is coupled into the input of the raster generator of the present invention. The raster generator described herein generates scanning signals relative to a second rectangular coordinate system rotated by the input angle.

More specifically, sweep signal generator means are provided for generating raster-type sweep signals for input to the deflection circuitry of a cathode ray tube or similar display device such that each raster-type sweep signal has as its point of origin a different coordinate selected from the set $\{u,v\}$ where $$u = x \cos \theta + y \sin \theta$$

and $$v = -x \sin \theta + y \cos \theta.$$

where x is a constant and y is selected from the set of integers $\{y\}$. The best mode implementation set forth herein describes the present invention as an entirely digital design thereby overcoming the limitations of the prior art such as accuracy, stability and reliability. Further, this digital implementation has the additional advantages that it is less expensive, smaller in size, lighter and does not suffer from the alignment and hunting problems associated with the prior art techniques and approaches.

OBJECTS OF THE INVENTION

It is a principal object of the present invention to disclose a means for displaying the turning or rolling motion of a vehicle or other apparatus in an inexpensive, reliable and accurate manner.

It is another object of the present invention to disclose a means for displaying the turning or rolling motion of a vehicle or other apparatus that is relatively insensitive to shock and vibration.

Another object of the present invention is to disclose a means for generating a rotatable raster scan on a random scan display that requires no periodic alignment procedures.

It is a still further object of the present invention to disclose a means for generating a rotatable raster scan on a random scan display terminal that is compatible with real time simulation of the turning motion of a vehicle or other device.

Other objects, advantages and novel features of the invention will become apparent from the following detailed description of the invention when considered in conjunction with the accompanying drawings.

BRIEF DESCRIPTION OF THE DRAWINGS

FIG. 2 is a graphical representation of a radial scan sweep displaced at an angle $\theta$.

FIG. 3 is a graphical representation of a raster-type scan as generated by the present invention without rotation and further illustrating the starting points of each scan line.

FIG. 4 is a graphical representation of the raster-type scan illustrated in FIG. 3 as rotated by the angle $\theta$ and having the new points of origin determined by the set of values $\{u,v\}$.

FIG. 8 is a graphical representative of the quandrant and sign conventions used in the present invention.

FIG. 9 is a timing diagram of the signals relating to the sign control used in the present invention.

FIG. 10 is a timing diagram illustrating the enabling signals of the rate multipliers of the present invention.

DESCRIPTION OF THE PREFERRED EMBODIMENT

Figure 1:
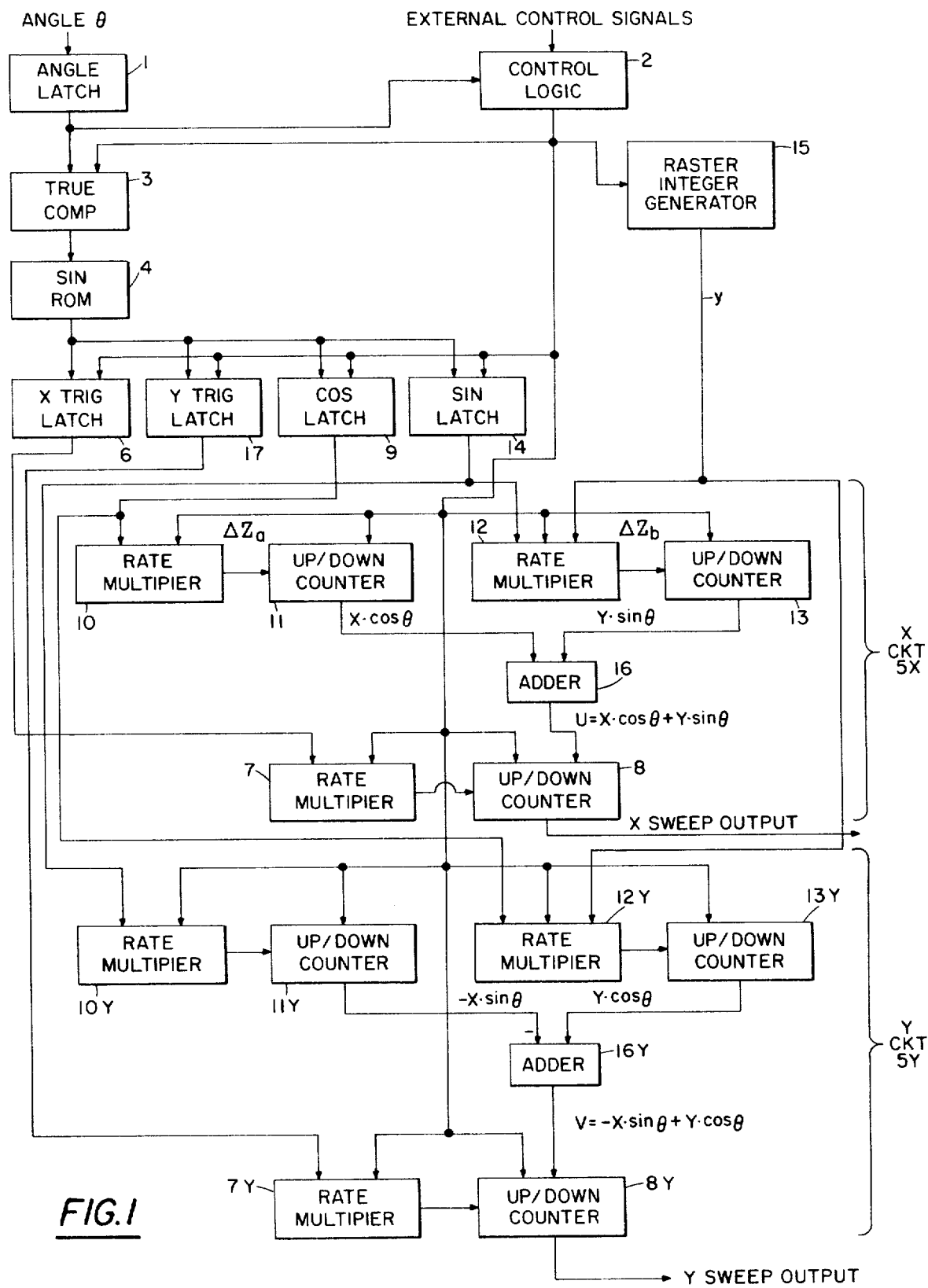
FIG. 1 is a schematic block diagram of the rotatable raster generator of the present invention

Referring now to FIG. 1 the rotatable raster generator will be described. A portion of the network illustrated in FIG. 1 is similar to one type of implementation of a radial scan generator. A radial scan is the basic scan employed in the familiar radial PPI presentation. This invention may be considered to have two modes of operation, the first being a conventional radial scan and the novel mode disclosed herein being the rotatable raster. For purposes of understanding, it is assumed that a simple sweep is to be generated where the sweep originates at the center of the presentation as in a conventional radar indicator. It is further assumed that the sweep is displaced at some angle $\theta$ as illustrated in FIG. 2. The sweep can be broken into an X component and a Y component. The conventional generation of the X component will be considered first with the understanding that the generation of the Y component is similar.

A digital signal representing the angle $\theta$, the desired angle of rotation, enters the rotatable raster generator and is loaded into the latch network 1. The latch network 1 is referred to as an angle latch because it stores the angle $\theta$. The angle latch 1 is loaded with the latest value of the angle $\theta$ only during the vertical interval of the T.V. raster. In this way no transient conditions will be noticeable in the T.V. picture. The two most significant bits, MSB's, out of the angle latch 1 are coupled to a control logic circuit 2. The two MSB's represent quadrant information and are thereby used to modulate various control signals as $\theta$ progresses from quadrant to quadrant as defined and illustrated in FIG. 8. The remaining bits of $\theta$ are coupled to a true/complement circuit 3. The output selection of the true/complement circuit 3 is either the true value or the complement of the angle $\theta$. The selection is determined by the control logic 2 which couples a signal derived mainly from the MSB information to the true/complement circuit 3. The true/complement circuit 3 couples either the true or the complement of the angle $\theta$, wherein the complement of the angle $\theta$ is $(90° - \theta)$, to a sin ROM 4. In this way both the sine and cosine values can be retrieved from only a sin ROM by virtue of the basic trigonometric relation $\cos \theta = \sin (90° - \theta)$.

The portion of the rotatable raster generator that produces the X sweep component output will now be described. This portion of the raster generator is designated in general by the numeral 5X with the understanding that a similar combination of logic is provided for the Y sweep component and designated in FIG. 1 by the notation 5Y.

The control logic circuit 2 loads the properly selected trig function, either the sine or cosine depending on the quadrant $\theta$ is in, into a latch network 6 designated as the X TRIG latch network, the output of which is passed to a rate multiplier 7. The rate multiplier 7 multiples at a differential level the value of cosine of $\theta \times \Delta R$ where $\Delta R$ can be considered a differential of range in a conventional PPI display or a differential of the raster line in a raster scan. This relationship may be expressed as $$\Delta X = (\cos \theta) \Delta R \tag{1}$$

where $\Delta X$ is the output of the rate multiplier 7. The $\Delta X$'s are accumulated in an up/down counter 8. Hence, the up/down counter 8 is operationally a discrete integrator with an output X as expressed by $$X = \Sigma (\cos \theta) \Delta R \tag{2}$$

$$X = R \cos \theta \tag{3}$$

Again up to this point a conventional radial sweep generator's X sweep component has been described where all sweeps start from a common point, i.e. the center of the screen. In the raster rotation mode the value of R is equal to the number of picture elements in one raster line.

In the raster generator portion of this invention, each conventional sweep originates from a different point of origin. The set of origin points is ordered and illustrated in FIG. 3. The number of origin points corresponds to the number of useable raster lines 20. To rotate the raster, the angle of rotation $\theta$ shown in FIG. 4 is used in two different ways. The first way that $\theta$ is used is by the conventional radial generator described above but differing in that each sweep has a different point of origin and all sweeps are parallel. The angle $\theta$ is also used by additional circuitry to be described below. This circuitry takes the set of points of origin shown in FIG. 3 and generates a new set of points of origin which are rotated by the angle $\theta$. These new points of origin are illustrated in FIG. 4 by the set $\{u,v\}$.

The circuitry utilized to generate the rotated set of points of origin will now be described. This circuitry is based on the common rotation of axis equations $$u = x \cos \theta + y \sin \theta \tag{4}$$

$$v = -x \sin \theta + y \cos \theta \tag{5}$$

Considering equation (4) the term $x \cos \theta$ is obtained by retrieving $\cos \theta$ from the sin ROM 4 and loading it into a latch network 9 designated as the COS latch. The COS latch 9 couples the value of $\cos \theta$ to a rate multiplier 10. Assuming the output of the rate multiplier 10 is defined as $\Delta Z_a$, an up/down counter 11 integrates this discrete quantity $\Delta Z_a$ yielding $$Z_a = \Sigma \cos \theta \cdot \Delta x \tag{6}$$

$$Z_a = x \cdot \cos \theta \tag{7}$$

Noting from FIG. 3 that $x = -a$, a constant, equation (7) becomes $$Z_a = -a \cos \theta \tag{8}$$

The control logic circuit 2 determines the starting and stopping times of the rate multiplier 10 as well as the timing of $\Delta x$ into the rate multiplier 10.

The second term in equation (4) defined as $Z_b$ where $$Z_b = y \sin \theta \tag{9}$$

results from the joint operation of the rate multiplier 12 and an up/down counter 13 in a fashion similar to that described above with respect to the quantity $Z_a$ except that y is not a constant and the value $\sin \theta$ is introduced into the rate multiplier 12 from a SIN latch 14 which is sourced by the SIN ROM 4 under control of the control logic 2. The variable nature of y is illustrated in FIG. 3 and is described by the set of integers bounded by and including $(n-1)$ and $-(n-1)$ where $n = 2^m$ and m is a positive integer. The most natural value of m for a common television standard like RS-170, an EIA standard, is 8; hence the set of integers hereinafter called raster integers $\{255, 254, 253, \ldots, 3, 2, 1, 0, -1, -2, -3, \ldots, -254, -255\}$ each represent a raster line 20. With reference to the unrotated raster illustrated in FIG. 3, the positive raster integers are associated with the top half of the raster, 0 defines the center of the raster and the negative raster integers are associated with the lower half of the raster. Each of the raster integers are effectively interjected into the rate multiplier 12 by controlling its turn-on to turn-off time duration. This control over the rate multiplier 12 originates from the raster integer generator 15. Raster integer generator 15 supplies odd raster integers for the odd T.V. field and even raster integers for the even T.V. field. Raster integer generator 15 generates the raster integers using a counter clocked at the raster line rate. The raster integer generator 15 couples the raster integers to the rate multiplier 12 one raster line early. Thus terms $Z_a$ and $Z_b$ are generated one line early. The terms $Z_a$ and $Z_b$, both early, are added as required by equation (4) in an adder 16 thus completing the manipulation of equation (4), the value of which represents one-half of the initial value or origin point for the next raster line 20. Hence, u is always generated in time one raster line before being used by the up/down counter 8.

The Y sweep network is comprised of the rate multiplier 10Y connected to the up/down counter 11Y the output of which is the quantity $-x \sin \theta$ and the rate multiplier 12Y is connected to the up/down counter 13Y the output of which is the quantity $y \cos \theta$. Adder 16Y receives the outputs of counters 11Y and 13Y and generates the set of values $\{v\}$ where $v = -x \sin \theta + y \cos \theta$. Rate multiplier 7Y has an input connected to the Y TRIG latch network 17 and its output connected to the up/down counter 8Y. The output of counter 8Y thus comprises the Y sweep component of the rotated raster. The circuit 5Y thus implements the equation (5) above in a manner conceptually the same as the implementation of equation (4) above by the circuit 5X as described above.

The control logic circuit 2 resets the rate multipliers 7, 10 and 12 and the up/down counters 8, 11 and 13 at the end of each raster line 20. The control logic 2 also controls the starting and stopping of the raster integer generator 15. A more detailed description and operation of the control logic 2 will be functionally described hereinbelow in terms of its output signals.

Figure 5:
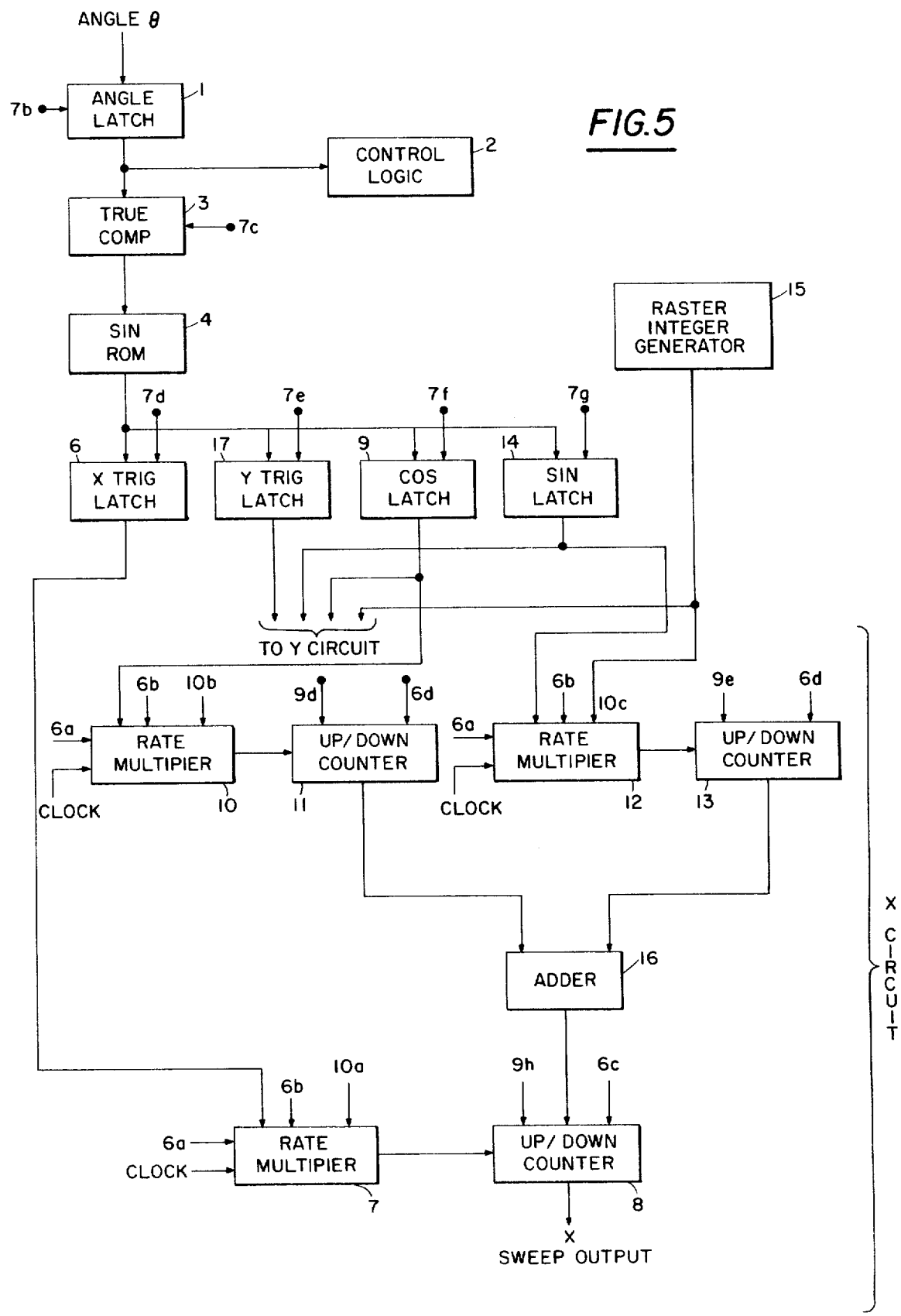
FIG. 5 is a schematic block diagram of the rotatable raster generator of the present invention showing in more detail the control lines from the control logic network.

FIG. 5 is a more detailed illustration of FIG. 1 in that the control lines from the control logic 2 are partitioned into a number of distinct control lines each of which is functionally different. For simplicity of illustration, it is assumed in FIG. 5 that all control lines not connected to a source block originate from the control logic 2. Further it is assumed that all signal names are designated by a numeral followed by a lower case alphabet letter. The numeral is referenced to the FIG. number containing the logical description of the signal and each signal in the FIG. is differentiated by the lower case alphabet letters.

Figure 6:
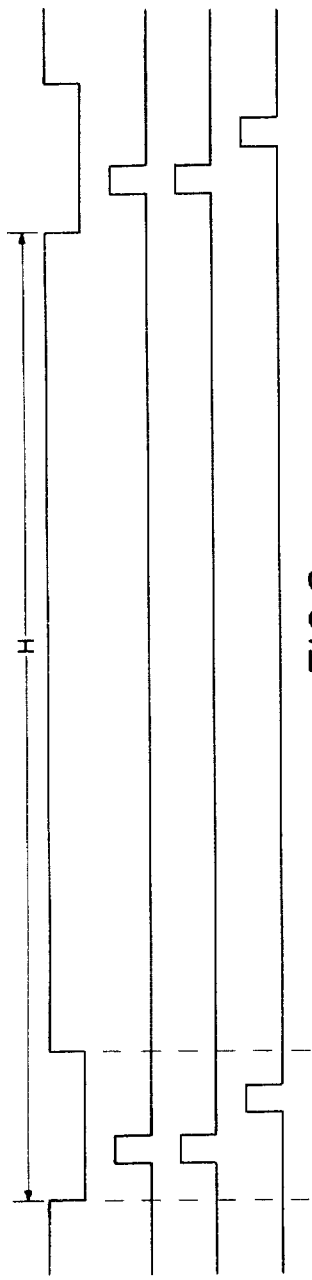
FIG. 6 is a timing diagram illustrating the reset signals of the rate multipliers and counters of the present invention.

A few terms used hereinafter shall be defined. A signal 6a shown in FIG. 6 defines a time span H of the raster line 20 shown in FIGS. 3 and 4. The time span H consists of two parts—an active and inactive horizontal time. The active horizontal time is shown as a high logic level or asserted state in FIG. 6. The inactive horizontal time is shown as a low logic level or negated state in FIG. 6. The inactive horizontal time includes that time in which conventional horizontal sync and blanking pulses occur. The active horizontal time consists of that time in which the horizontal raster line 20 is being generated.

Figure 7:
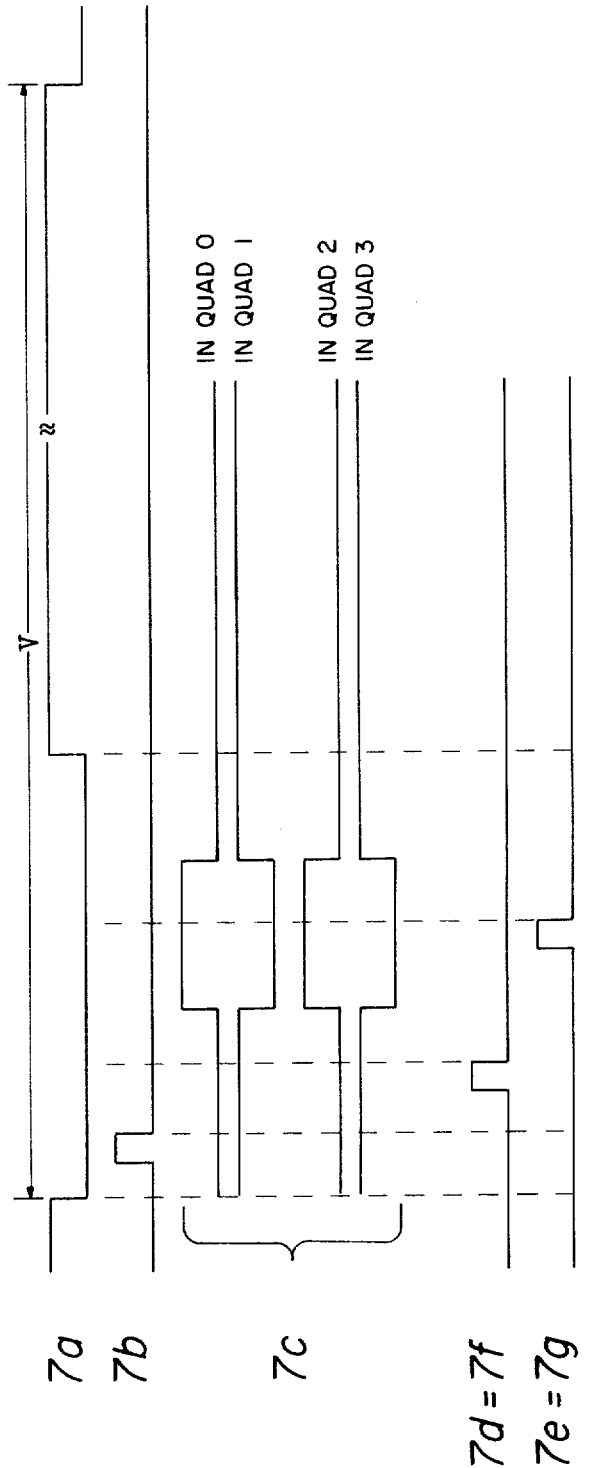
FIG. 7 is a timing diagram illustrating the timing of the signals for loading of the sine and cosine values into the latch networks of the present invention.

A signal 7a shown in FIG. 7 defines a time span V of a field 22 shown in FIGS. 3 and 4. The inactive vertical time is emphasized in FIG. 7 for clarity of disclosure. The field 22 consists of two parts—an active and inactive vertical time. The active vertical time is shown as a high logic level or asserted state in FIG. 7. The inactive vertical time is shown as a low logic level or negated state in FIG. 7. The inactive vertical time includes that time in which conventional vertical sync and blanking pulses occur. The active vertical time includes a set of horizontal lines 20 associated with picture information. A field 22 defines a time span in which a complete picture is displayed if a non-interlace format is used. The most common raster format in the U.S. is a 2:1 interlace where two interlaced fields define a complete picture.

The value of the angle $\theta$ is loaded into the angle latch 1 during the inactive vertical time of signal 7a. Specifically, the loading occurs when load signal 7b is asserted. The output of the angle latch 1 is coupled to the true/complement circuit 3. The output of the true/complement circuit 3 is the true value of angle $\theta$ or the complement of angle $\theta$. The true value of angle $\theta$ coupled to SIN ROM 4 provides an output of $\sin \theta$ and the complement of angle $\theta$ into SIN ROM 4 provides an output of $\cos \theta$. The SIN ROM 4 contains values of $\sin \theta$ for $0 < \theta < 90$. Therefore, the two MSB's of $\theta$ are not coupled to the SIN ROM 4 through the true/complement circuit 3. The two MSB's of $\theta$ are coupled to the control logic 2. Many of the control signals described hereinafter are a function, in part, of these two MSB's of $\theta$ which specify quadrant information.

The values of sine and cosine from SIN ROM 4 are loaded into the latches 6, 17, 9 and 14 during the inactive vertical time but only after the assertion of load signal 7b. Referring first to the contents of the SIN LATCH 14, the output of which is to be coupled to rate multiplier 12, rate multiplier 12 receives $\sin \theta$ as explained hereinabove with reference to the second product term in equation (4). If the angle $\theta$ is between 0 and 90, retrieval of $\sin \theta$ is straightforward. However, for $90 < \theta < 360$ the retrieval of $\sin \theta$ is more complex. Referring to trigonometric theory and FIG. 8, $$\sin \theta = \sin \theta \text{ in quadrant } 0 \qquad (10a)$$

$$\sin \theta = \sin (180 - \theta) \text{ in quadrant } 1 \qquad (10b)$$

$$\sin \theta = \sin (\theta - 180) \text{ in quadrant } 2 \qquad (10c)$$

$$\sin \theta = \sin (360 - \theta) \text{ in quadrant } 3 \qquad (10d)$$

where in this mechanization quadrants 0, 1, 2 and 3 are defined in FIG. 8. Since the MSB's are not carried through to the SIN ROM 4, in quadrant 1 where $90° < \theta < 180°$ the value of $\theta$ into SIN ROM 4 appears as some number of degrees in excess of 90°. Equation (10b) for quadrant 1 is modified by another trigonometric relation expressed here in general terms. Specifically, $\sin \alpha = \cos (90 - \alpha)$. Hence equation (10b) becomes $$\sin \theta = \cos (\theta - 90) \qquad (11)$$

where the argument of the cosine term, $(\theta - 90)$, is the aforementioned number of degrees in excess of 90°. For example if $\theta = 120$, equation (11) becomes $\sin 120° = \cos 30°$. The cosine of an angle between 0° and 90° can be obtained from the SIN ROM by the complement of the angle. In this example then, $\cos 30 = \sin 60$ which is indicated by equation (10b) since $$\sin 120° = \sin 60°.$$

With similar arguments for $\sin \theta$ in quadrants 2 and 3, for the $\cos \theta$ term in equation (4) which is furnished to the rate multiplier 10, and for cos θ term in equation (3) furnished to rate multiplier 7 as well as the rate multipliers 10Y, 12Y and 7Y in the Y circuit (FIG. 1), the result is a trig select signal 7c. The negated state of trig select signal 7c couples the negated value of angle θ to the SIN ROM 4. Therefore the output of the SIN ROM 4 is the cosine of the angle θ. The asserted state of the trig select signal 7c couples the true value of the angle θ.

The loading of the selected value of sine or cosine into the X TRIG latch 6, Y TRIG latch 17, COS latch 9, and SIN latch 14 is accomplished when the load signals 7d, 7e, 7f, and 7g are in the asserted state. It is noted that the loading occurs during the inactive vertical time as shown in FIG. 7. The latches 6, 17, 9 and 14 hold the selected values of sine and cosine steady during the subsequent active vertical time when the raster lines 20 are generated.

The resulting sign of the sine and cosine terms in equation (4) is effected by three determinants. First, from FIG. 3 it is noted that the sign of X is negative because X is always a negative constant, i.e. $X = -a$. Second, the sign of the sine and cosine terms change from quadrant to quadrant as shown in FIG. 8. Third, from FIG. 3 it is apparent that the sign of y is positive during the top half of the field 22 and negative during the lower half of the field 22. The signal that differentiates the top half of the screen by its asserted state from the lower half of screen by the negated state is designated as the half field against 9c. The half field signal 9c is illustrated along with other related signals in a typical field in each of the four quadrants. The four quadrants are defined by the two MSB's of the angle θ — MSB1 is 9a and MSB2 is 9b. Signal 7a from FIG. 7 is included in FIG. 9 to place it in perspective. Signals 9d, 9e, 9f, and 9g are the sign control signals. Signal 9d is coupled to up/down counter 11 associated with the cos term in equation (4). Signal 9e is coupled to the up/down counter 13 associated with the sin term in equation (4). Signals 9f and 9g are coupled to the corresponding counters in the Y circuit (not illustrated in FIG. 5). Signal 9f is associated with the sin term in equation (5) and 9g with the cos term in equation (5). Up/down counter 8 associated with the X sweep as described by equation (3) has signal 9h coupled into it. Signal 9i is associated with the Y sweep and described by the equation $Y = R \sin \theta$ which, in the Y circuit (not illustrated in FIG. 5), parallels equation (3), $X = R \cos \theta$, of the X circuit. When the sign control signals 9d, 9e, 9f, 9g, 9h and 9i are in an asserted state, the respective up/down counters count down, yielding numbers that are negative. When the sign control signals 9d, 9e, 9f, 9g, 9h and 9i are in a negated state the respective up/down counters count up yielding numbers that are positive. The logic equations for the sign control signals shown in FIG. 9 are $$9d = \overline{9a \oplus 9b} \tag{11a}$$

$$9e = \overline{9a \oplus 9c} \tag{11b}$$

$$9f = 9a \tag{11c}$$

$$9g = \overline{9a \oplus 9b \oplus 9c} \tag{11d}$$

$$9h = 9a \oplus 9b \tag{11e}$$

$$9i = \overline{9a} \tag{11f}$$

All rate multipliers have continuous clock inputs. Enable signals allow the rate multipliers to operate only when the enable signals are asserted. All three rate multipliers are enabled by different signals. Rate multiplier 7 is enabled by signal 10a which is the logical AND of signals 6a and 7a. The enable pulse 10a in essence gates into the rate multiplier 7 during the active horizontal time a number of clocks that correspond to the number R in equation (3). Rate multiplier 10 begins counting one horizontal line time, H, early as explained above. Hence, the enable pulse 10b which is coupled into rate multiplier 10 is asserted one horizontal line time, H, before 10a. When enable pulse 10b is asserted, it gates a fixed number of clocks into rate multiplier 10 that correspond to X in equation (4). The enable pulse 10c relates to the variable Y in equation (4) as explained above. The variable nature of 10c is depicted by the cross hatched trailing edge of the signal illustrated in FIG. 10. Signal 10c is coupled to rate multiplier 12 from the raster integer generator 15. When the enable signal 10c is asserted it gates into rate multiplier 12 a set of clock pulses during the active horizontal line time for an amount of time that corresponds to the absolute value of the line number generally designated by $y_n$ in FIG. 3. Signal 10c also starts early one horizontal line time, H, since it is associated with signal 10b by virtue of equation (4).

Half field signal 9c changes state one horizontal line time, H, before the physical center of the screen where the values of y shown in FIG. 3 change in sign. This change in signal 9c is necessary so that the sign control signals, shown in FIG. 9 and defined in equation 11 as a function of signal 9c, will be ready one horizontal line time, H, early to generate the initial values {u,v} for the next horizontal line.

The rate multipliers and up/down counters must be reset during the inactive horizontal time. Reset signal 6b resets rate multiplier 10, 12, and 7 to zero; the reset action occurs during the assertion of 6b which can occur any time during the inactive horizontal time. During the inactive horizontal time the added contents, u, of equation (4) of up/down counters 11 and 13 are loaded into up/down counter 8 by signal 6c; the contents, u, of equation (4) represent one-half of the origin point (u,v) for a raster line 20. Upon leading u of equation (4) into up/down counter 8, the output, X sweep, will appear at the output of the up/down counter 8. The X sweep signal normally will be coupled to a display having a digital to analog (D/A) converter. The output of the D/A converter coupled to the X deflection yoke controls the position of the electron beam. Since the reset of the up/down counter 8 initiates a movement of the electron beam across the entire display screen, the reset signal 6c for up/down counter 8 should occur early in the inactive horizontal time to allow adequate time for the electron beam to be repositioned. Since reset signal 6b can be situated anywhere in the inactive horizontal time, 6b and 6c could be one in the same. After the assertion of 6c but before the assertion of 6a, the reset signal 6d may reset up-down counters 11 and 13.

Figure 11:
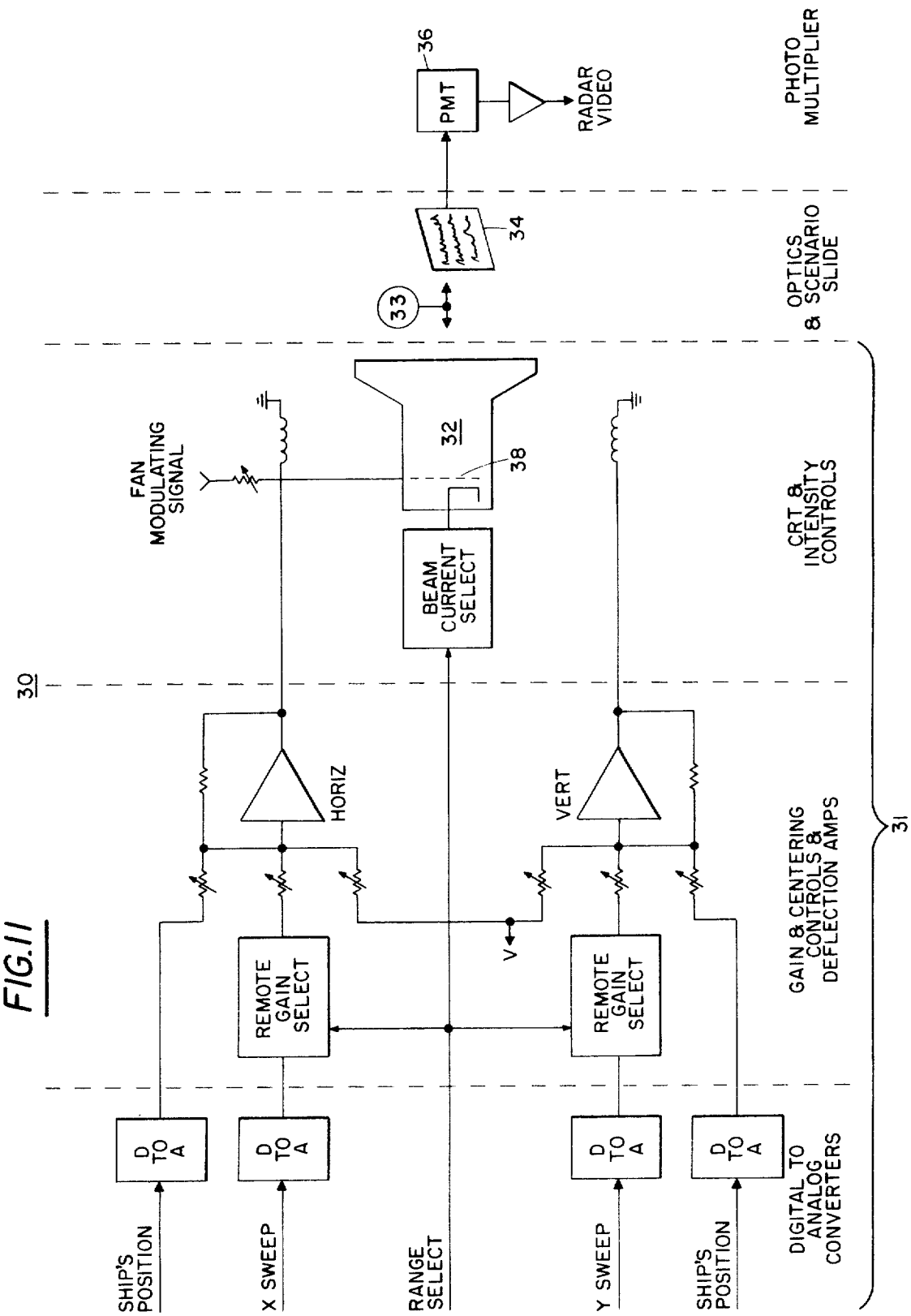
FIG. 11 is a schematic diagram of a practical example of a system in which the invention may be used.

A practical example of the application of the invention is in the simulation of a radar display on a boat or ship. The output of the rotatable raster generator of the present invention consists of signals that define a raster rotatable to the angle of the boat's heading. The rotatable raster is illustrated as being coupled to a flying spot scanner, (FSS) 30, illustrated in FIG. 11. The FSS consists of a random scan display 31 which produces a pencil of light emitted from the face of a CRT 32 in a pattern defined by the raster. The emitted light is coupled through an optical structure 33 to a slide 34 having a map of a harbor, for example, complete with areas of water, land mass and buoys, etc. The light intensity is modulated as the light beam moves through different shades of gray in the slide 34. The modulated light beam is detected by a photomultiplier tube 36, amplified, and coupled as video to a conventional raster scan TV monitor operating in synchronization with the timing of the raster on the FSS 30. To give the TV monitor's raster scan presentation the appearance of a radial scan (often referred to as PPI display presentation), the grid 38 of the FSS 30 is modulated by a signal having a special rotating fan-like structure; hence, the beam of light from the face of FSS CRT 32 is no longer generated continuously as is the raster but rather in a piecemeal fashion simulating a rotating fan. To simulate range scale change, the size of the rotating raster is changed in the FSS 30.

Obviously many modifications and variations of the present invention are possible in the light of the above teachings. It is therefore to be understood that within the scope of the appended claims the invention may be practiced otherwise than as specifically described.

What is claimed is:

1. An apparatus for generating a rotated raster comprising:

input means for receiving a signal representing a desired angle of rotation $\theta$;

starting point generator means connected to said input means for generating signals representing the set of values $\{u,v\}$ wherein $$u = x \cos \theta + y \sin \theta,$$

$$v = -x \sin \theta + y \cos \theta$$

and where x is a constant;

integer generator means connected to said starting point generator means for generating a set of raster integer values $\{y\}$ and for outputting selected ones of said set of values $\{y\}$ to said starting point generator means; and sweep means connected to said starting point generator means for generating raster-type sweep signals for input to the deflection circuitry of a random scan display such that each said raster-type sweep signal has as its point of origin a different coordinate selected from the set $\{u,v\}$;

said starting point generator comprising a first latch network (cos) connected to said input means;

a second latch network (sin) connected to said input means;

a first multiplier network connected to said first latch network for generating said quantity x cos $\theta$;

a second multiplier network connected to said second latch network for generating said quantity y sin $\theta$;

a third multiplier network connected to second latch network for generating said quantity $-x$ sin $\theta$;

a fourth multiplier network connected to said first latch network for generating said quantity y cos $\theta$;

a first adder connected to said first and second multiplier networks for generating said set of values $\{u\}$; and a second adder connected to said third and fourth multiplier networks for generating said set of values $\{v\}$.

2. The apparatus of claim 1 wherein said input means comprises:

a latch network;

a true/complement network connected to the output of said latch network for outputting either a signal representative of the angle $\theta$ or a signal representing the angle $(90-\theta)$; and a read-only-memory connected to the output of said true/complement network.

3. The apparatus of claim 1 further comprising a control logic network connected to said input means, said integer generator means, said starting generator point means and said sweep means for controlling the timing and sequencing thereof.

4. The apparatus of claim 1 wherein said sweep means comprises:

a third latch network (X TRIG) connected to said input means;

a fourth latch network (Y TRIG) connected to said input means;

a fifth multiplier network preset by said set of values $\{u\}$ and connected to said third latch network for generating the X sweep component of said rotated raster; and a sixth multiplier network preset by said set of values $\{v\}$ and connected to said fourth latch network for generating the Y sweep component of said rotated raster.

5. The apparatus of claim 4 wherein each of said first, second, third, fourth, fifth and sixth multiplier networks comprises a rate multiplier connected to an up/down counter.

6. The apparatus of claim 1 wherein said sweep means comprises:

a pair of latch networks connected to said input means;

a pair of rate multipliers connected to said pair of latch networks, and a pair of up/down counters connected to said pair of rate multipliers.

7. The apparatus of claim 6 including a control logic network means for controlling the timing and sequencing of said input means, said starting point generator means, said integer generator means and said sweep means.

8. The apparatus of claim 7 wherein said input means comprises:

an input latch network;

a true/complement network connected to the output of said input latch network for outputting either a signal representative of the angle $\theta$ or a signal representing the angle $(90° - \theta)$; and a read-only-memory connected to the output of said true/complement network.

9. A rotating raster generator comprising:

input means for receiving a signal representing a desired angle $\theta$ of rotation;

starting point generator means connected to said input means for generating signals representing the set of values $\{u,v\}$ where $$u = x \cos \theta + y \sin \theta$$

and $$v = -x \sin \theta + y \cos \theta$$

where x is a constant and y is selected from a set {y} of raster integers, said starting point generator means including an integer generator means for generating signals representative of the values of the set {y} and for outputting signals representative of selective ones of said set of values {y}, and further comprising first means for generating signals representing the set of values x cos $\theta$, second means for generating signals representing the set of values y sin $\theta$ and third means connected to said first and second means for adding the outputs of said first and second means, said starting point generator means further comprising fourth means for generating signals representing the set of values $-x \sin \theta$, fifth means for generating signals representing the set of values y cos $\theta$ and sixth means connected to said fourth and fifth means for adding the outputs of said fourth and fifth means; and sweep means connected to said starting point generator means for generating raster-type sweep signals for input to the deflection circuitry of a random scan display such that each said raster-type sweep signal has as its point of origin a different coordinate selected from the set {u,v}.

10. The method of generating signals for input to the deflection circuit of a CRT such that said CRT displays a raster-type scan that is rotatable by a desired angle $\theta$ comprising the steps of:

(1) generating a set of signals representing a set {y} of integer values;

(2) receiving a signal representing a desired angle $\theta$ of rotation of said raster-type scan;

(3) generating a set of signals representing the set of values {u,v} by adding signals representing the set of values x cos $\theta$ to signals representing the set of values y sin $\theta$ and by adding signals representing the set of values $-x \sin \theta$ to signals representing the set of values y cos $\theta$ where $$u = x \cos \theta + y \sin \theta$$

and $$v = -x \sin \theta + y \cos \theta,$$

where x is constant and the values y are selected from the set of signals representing the set {y} of integer values; and (4) generating raster-type sweep signals for input to said deflection circuit such that each said raster-type sweep signal has as its point of origin a different coordinate selected from the set {u,v}.

* * * * *